US012535771B2

(12) United States Patent
Moyse et al.

(10) Patent No.: US 12,535,771 B2
(45) Date of Patent: Jan. 27, 2026

(54) DEFORMABLE WATCH CASE

(71) Applicant: CARTIER INTERNATIONAL AG, Steinhausen (CH)

(72) Inventors: Romain Moyse, Montlebon (FR); Mathurin Kielpinski, Payerne (CH); Olivier Tirand, Morteau (FR)

(73) Assignee: CARTIER INTERNATIONAL AG, Steinhausen (CH)

( * ) Notice: Subject to any disclaimer, the term of this patent is extended or adjusted under 35 U.S.C. 154(b) by 321 days.

(21) Appl. No.: 18/251,204

(22) PCT Filed: Jul. 8, 2021

(86) PCT No.: PCT/EP2021/069044
§ 371 (c)(1),
(2) Date: Apr. 28, 2023

(87) PCT Pub. No.: WO2022/089793
PCT Pub. Date: May 5, 2022

(65) Prior Publication Data

US 2023/0393529 A1 Dec. 7, 2023

(30) Foreign Application Priority Data

Nov. 2, 2020 (CH) .................................... 01403/20

(51) Int. Cl.
*G04B 37/14* (2006.01)
*G04B 45/00* (2006.01)

(52) U.S. Cl.
CPC ......... *G04B 37/14* (2013.01); *G04B 45/0076* (2013.01)

(58) Field of Classification Search
CPC .. G04B 37/14; G04B 45/0076; G04B 37/052; G04B 37/22; G04B 45/0069; G04B 37/0418; G04B 37/04; A44C 27/00
See application file for complete search history.

(56) References Cited

U.S. PATENT DOCUMENTS

| | | | | |
|---|---|---|---|---|
| 2,511,105 A * | 6/1950 | Fenyvessy | ......... | G04B 37/1433 368/286 |
| 3,365,877 A | 1/1968 | Altman | | |
| 5,332,135 A * | 7/1994 | Fletcher | ............... | G04B 37/005 224/171 |

(Continued)

FOREIGN PATENT DOCUMENTS

| | | |
|---|---|---|
| EP | 0703512 A2 | 3/1996 |
| EP | 2328044 A1 | 6/2011 |
| WO | 2022089793 A1 | 5/2022 |

OTHER PUBLICATIONS

Foreign Communication from a Related Counterpart Application, International Search Report and Written Opinion dated Sep. 2, 2021, International Application No. PCT/EP2021/069044 filed on Jul. 8, 2021.

*Primary Examiner* — Edwin A. Leon
(74) *Attorney, Agent, or Firm* — Conley Rose, P.C.

(57) ABSTRACT

A watch case includes a structure arranged to support a watch movement, and a middle with an outer envelope connected to the structure and arranged to house the structure. The envelope comprises a network of articulated elements which form an outer wall of the outer envelope. The articulated elements are able to move with respect to one another so that the outer wall is deformable.

18 Claims, 5 Drawing Sheets

(56) References Cited

U.S. PATENT DOCUMENTS

Figure 1:
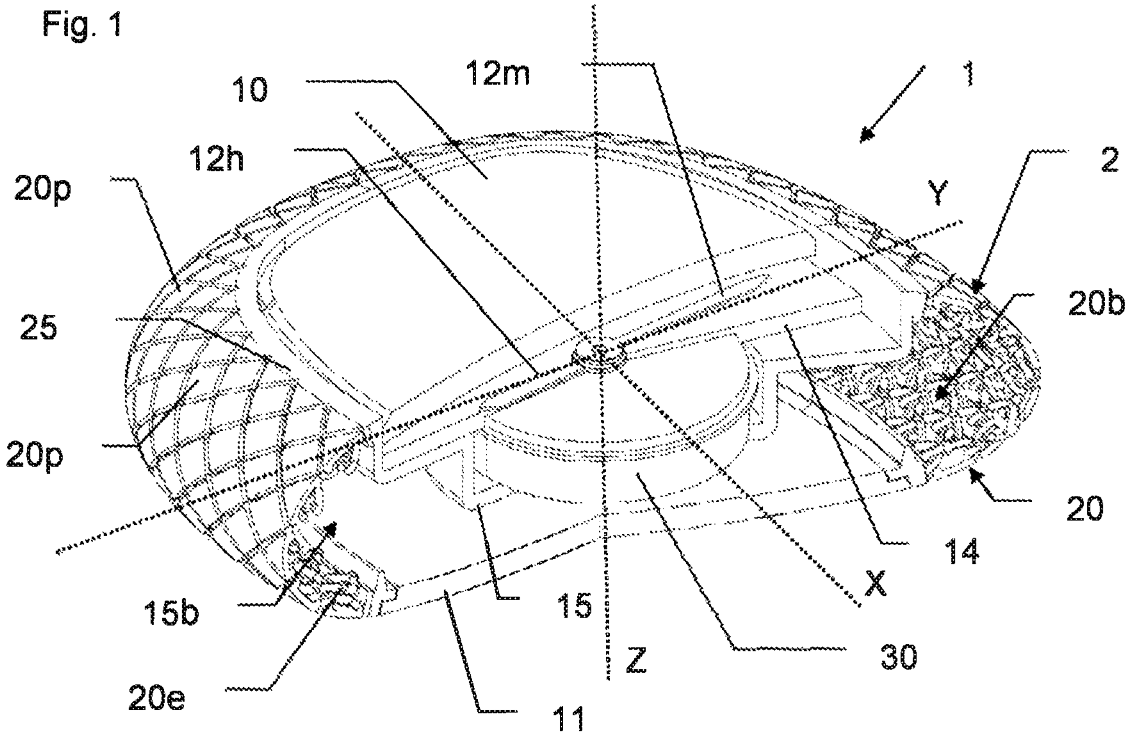

| | | | | | |
|---|---|---|---|---|---|
| 5,848,030 | A * | 12/1998 | Sullivan | G04B 37/1426 368/286 |
| 6,234,668 | B1 * | 5/2001 | Cooper | G04B 37/1406 368/286 |
| 6,799,887 | B1 * | 10/2004 | Kinney | A44C 5/00 368/282 |
| 6,870,796 | B2 * | 3/2005 | Elling | A42B 1/24 368/282 |
| D515,944 | S * | 2/2006 | Ohki | D10/32 |
| 7,175,340 | B1 * | 2/2007 | Kinney | G04B 37/1486 368/286 |

* cited by examiner

DEFORMABLE WATCH CASE

CROSS-REFERENCE TO RELATED APPLICATIONS

The present application is a filing under 35 U.S.C. 371 as the National Stage of International Application No. PCT/EP2021/069044, filed Jul. 8, 2021, entitled "DEFORMABLE WATCH CASE," which claims priority to Switzerland Application No. 01403/20, filed with the Intellectual Property Office of Switzerland on Nov. 2, 2020, both of which are incorporated herein by reference in their entirety for all purposes.

The present invention generally relates to the field of watchmaking, more particularly the field of dressing watches, including watch cases comprising operable or manipulable portions.

One of the essential functions of the watch case is to house the movement and to protect it from the environment and shocks, in order to preserve the mechanical parts and the lubricating fluids. Also, in general, watch cases are rigid, whether metal or plastic.

Some boxes are also known which comprise external rubber elements, arranged on the rigid parts, to absorb shocks or give a particular appearance.

In other box constructions, as described in document EP0703512, there is a push button obtained by a deformable element arranged in the box, making it possible to actuate the mechanical part of the pusher.

The present invention aims to provide a new box construction, offering new aesthetic and playful possibilities in the implementation and use. In particular, the new possibilities offered provide an improved user experience.

The invention relates to a watch case comprising:

a structure arranged to support a watch movement, and a middle part comprising an outer casing connected to said structure and arranged to house said structure, said casing comprising a network of articulated elements which together form an outer wall of the outer casing, the hinged elements being movable relative to each other and hinged to each other so as to make said outer wall deformable.

By deformable, it is meant here that the deformation of the wall takes place while maintaining the dimensions of the articulated elements, without material deformation. It is only the relative displacements of the articulated elements with respect to each other that allow the deformation. The degrees of freedom provided for in the design between the articulated elements thus determine the possible deformations. The box can therefore take an infinite number of forms, depending on the forces it is subjected to, whether it is pressure from the wearer, or even the action of gravity on the wall which, when free, can deform under its own weight. In addition, middle part means the middle part of the watch case in which the movement is placed. The back and the bezel are fixed to the middle part, directly or indirectly, to close the case, via the glass which is mounted on the bezel. Moreover and in other words, the articulated elements are articulated with each other. By articulated is meant the fact that the articulated elements are linked while retaining a faculty of movement relative to each other.

This makes it possible to offer a watch case with a deformable outer wall, which gives designers new possibilities for designing case shapes, and gives the user the possibility of having a more tactile interaction with his watch, with the possibility of deforming it and playing with it. In particular, the articulated elements linked together to form the network, allow the outer wall to resume, at least partially, its original shape and volume after having been subjected to compression, bending or even extension.

Preferably, the articulated elements are formed in one piece. Preferably, adjacent articulated elements are articulated together, or at least some adjacent articulated elements are articulated together.

In a preferred embodiment, the wall is elastically deformable.

This allows the watch case to return to its nominal shape after having been deformed by a stress, for example a support.

Advantageously, each articulated element comprises an outer panel.

Advantageously, the articulated elements comprise interlacings, preferably helical, meshing the articulated elements with each other.

This makes it possible to hold together and mesh together the articulated elements, so as to ensure the mechanical strength of the watch case.

Advantageously, at least one articulated element is supported by an elastic member, such as an elastic mesh.

This makes it possible to give an elastic character to the deformation of the outer wall, which returns to its initial shape after having been deformed, under the action of the elastic member. Where the outer wall is supported by the elastic member, it is no longer completely free to deform, in particular under its weight, if the elastic force is greater than the weight of the wall.

Advantageously, the watch case further comprises horns, and the elastic member comprises parts of elastic mesh, each part of elastic mesh being arranged around or on at least one of the horns.

This makes it possible to insulate the horns from the outer wall, by means of the elastic member, and to avoid excessively rigid behavior of the wall at the level of the horns.

Advantageously, the watch case includes a bottom. Said structure has a portion projecting towards the back of the watch case and capable of cooperating with the back to guide the movements of the structure during the deformation of the outer casing. Alternatively or additionally, the bottom has a portion projecting towards the inside of the watch case and capable of cooperating with the structure to guide the movements of the structure during the deformation of the outer casing.

This makes it possible to guide the movements of the structure or of the container and the deformations of the box, in order to maintain aesthetically predefined curves.

Advantageously, the bottom has a curvature whose center of curvature is on the side of the bottom.

Advantageously, the watch case includes lugs, and the center of curvature is also on the side of one of the lugs.

Advantageously, a gap is formed between the container and the outer casing or between a portion of the structure at the level of the container and the outer casing.

This makes it possible to ensure a clearance necessary for the movement of the container in the watch case, when the user presses on the case.

Advantageously, at least one articulated element is decorated, preferably by crimping, with a decorative element such as a stone.

This makes it possible to propose a technique for attaching decorative elements that is effective and safe, and thus improve the holding of the decorative elements and the aesthetics.

Advantageously, the outer casing comprises a removable element or an orifice arranged to allow access to means for adjusting and/or winding the movement housed in the container, typically by key.

This makes it possible to provide easy access to a watch adjustment means and thus improve the functions available on the watch case.

Advantageously, the watch case comprises a back, a structure intended to support a watch movement, a crystal closing the case, and a middle part comprising a deformable outer envelope housing the structure, so as to allow relative movement between the background and ice.

A second aspect of the present invention relates to a watch comprising a watch case according to the first aspect.

Advantageously, the watch comprises a bracelet connected to the watch case. The bracelet is made at least in part with articulated elements, formed in one piece with the articulated elements of said box.

Another aspect of the present invention relates to a jewel comprising a fastening or connecting member and a body comprising an outer envelope comprising a network of articulated elements which together form an outer wall of the outer envelope, the elements hinged being movable relative to each other so as to make said outer wall deformable.

According to a preferred embodiment, the outer wall is elastically deformable.

Figure 2:
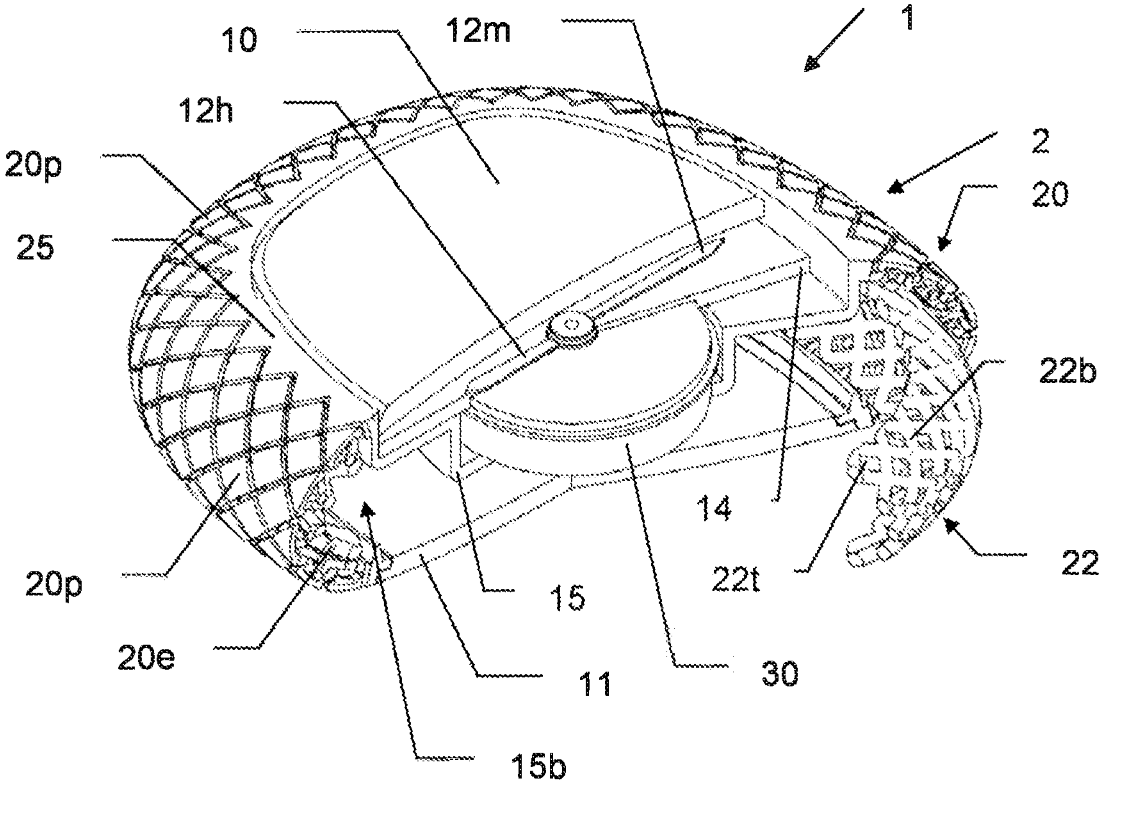
Figure 3:
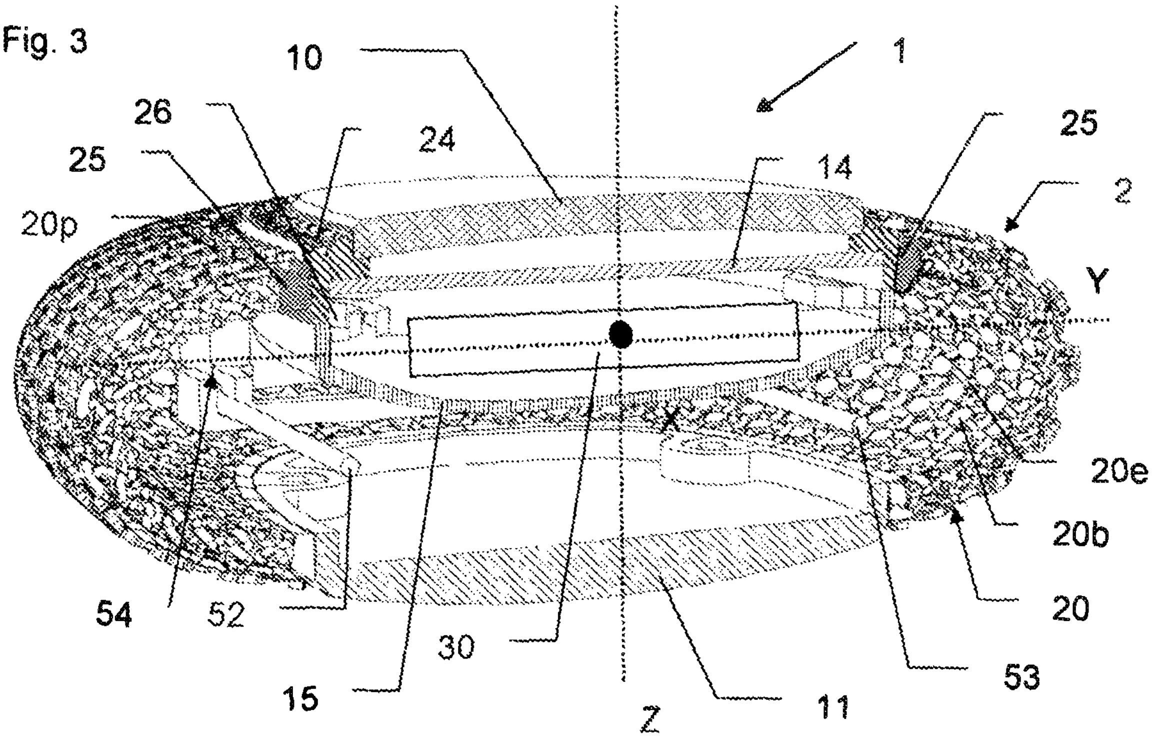
Figure 4:
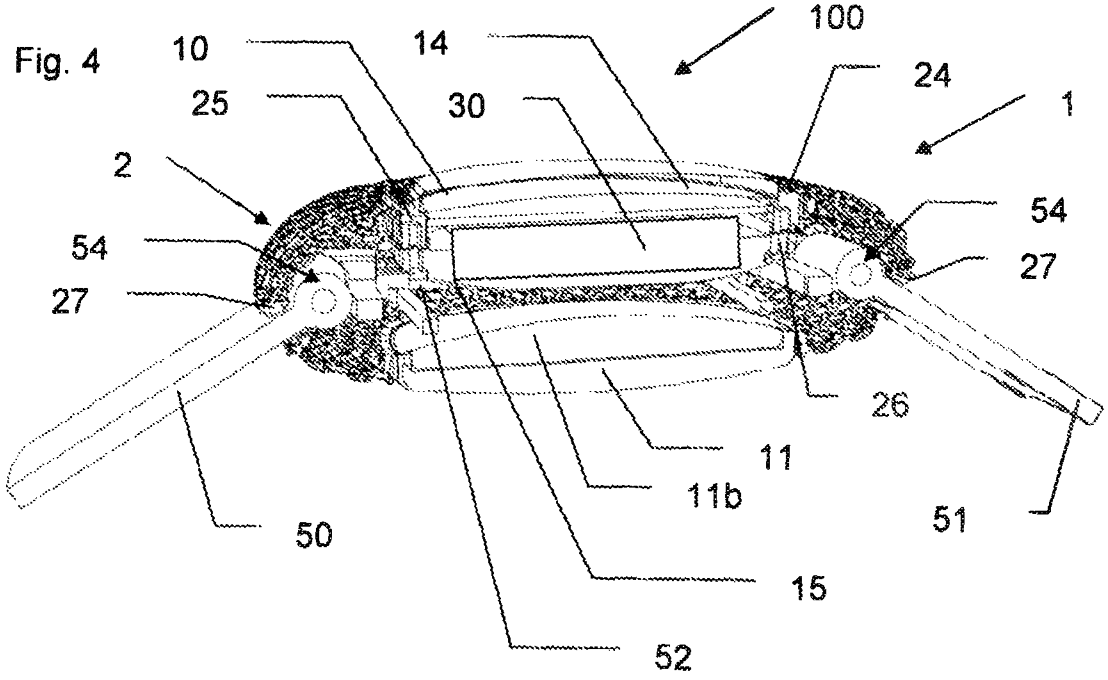
Figure 5:
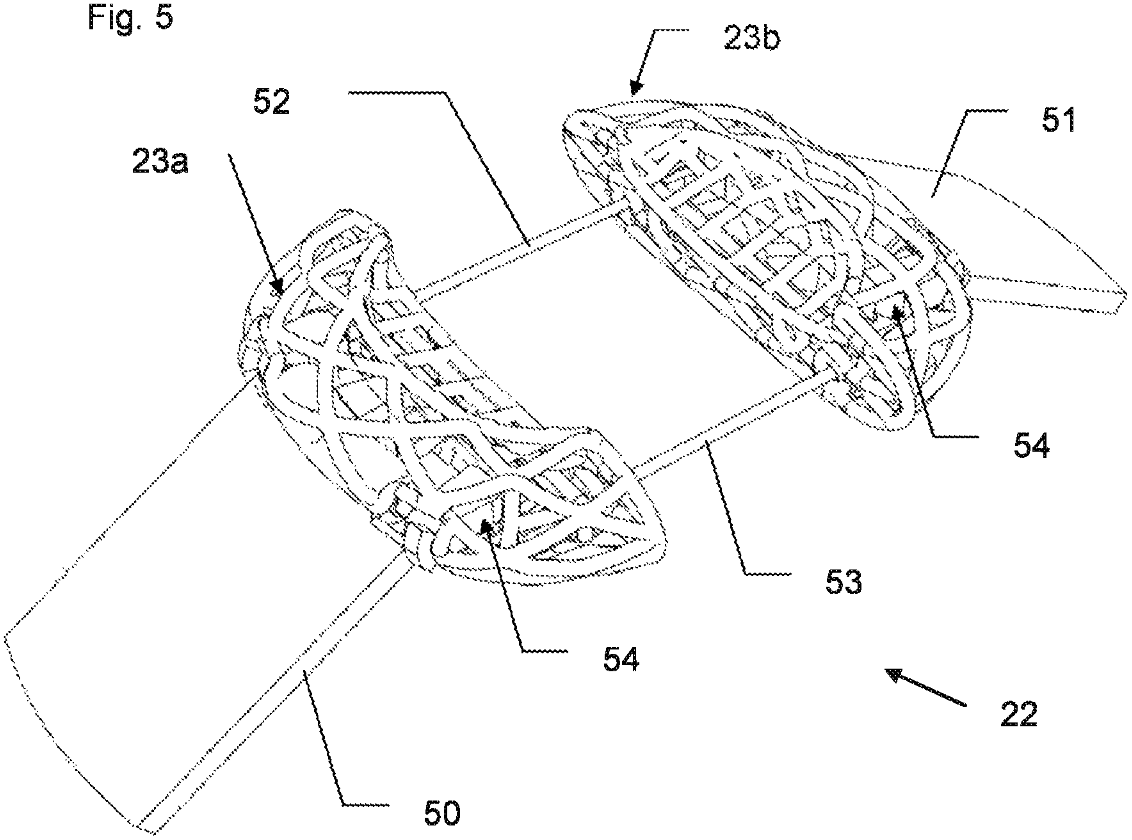
Figure 6:
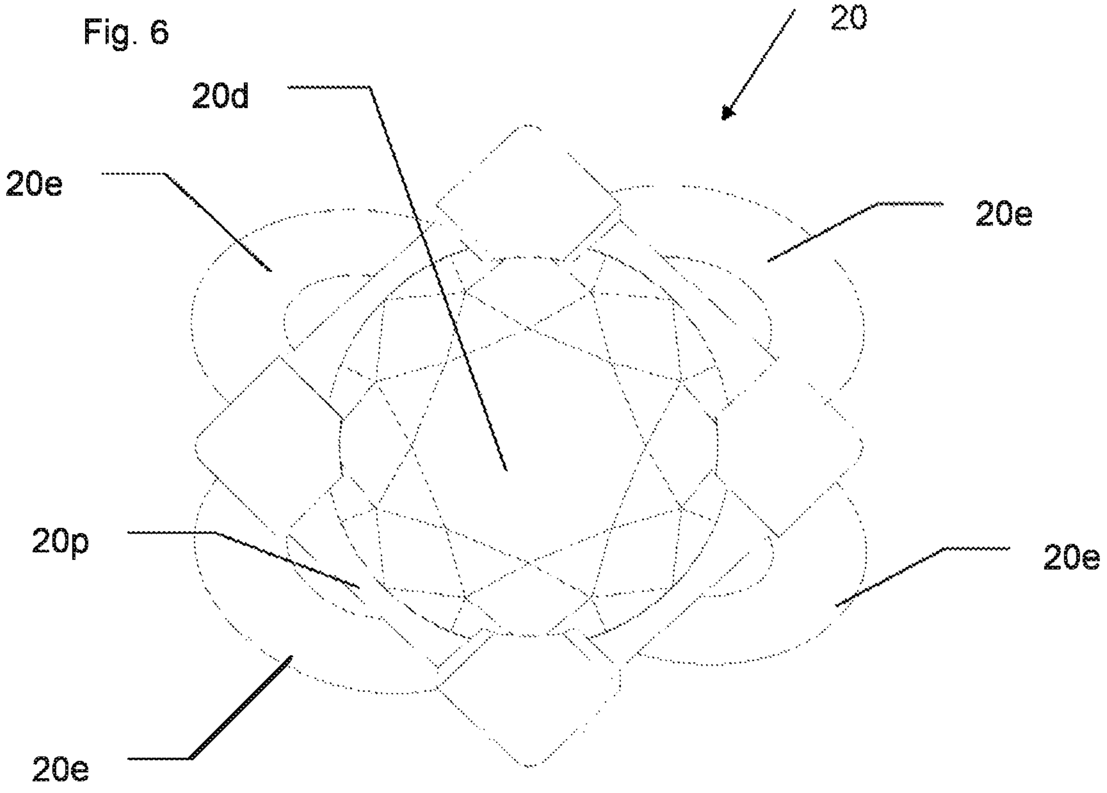
Figure 7:
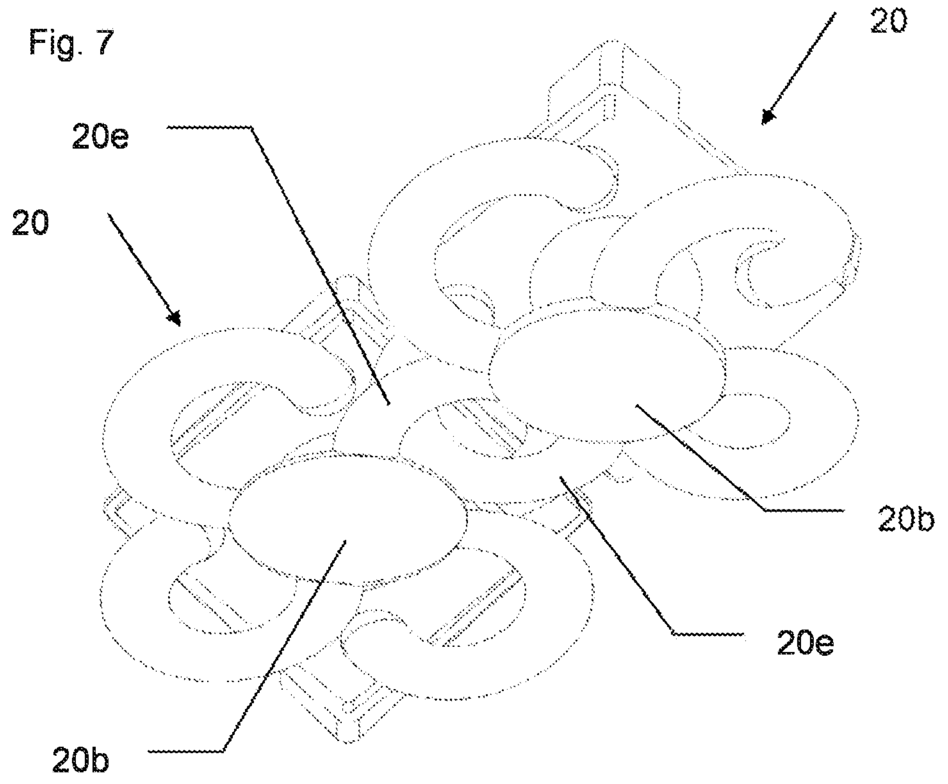
Figure 8:
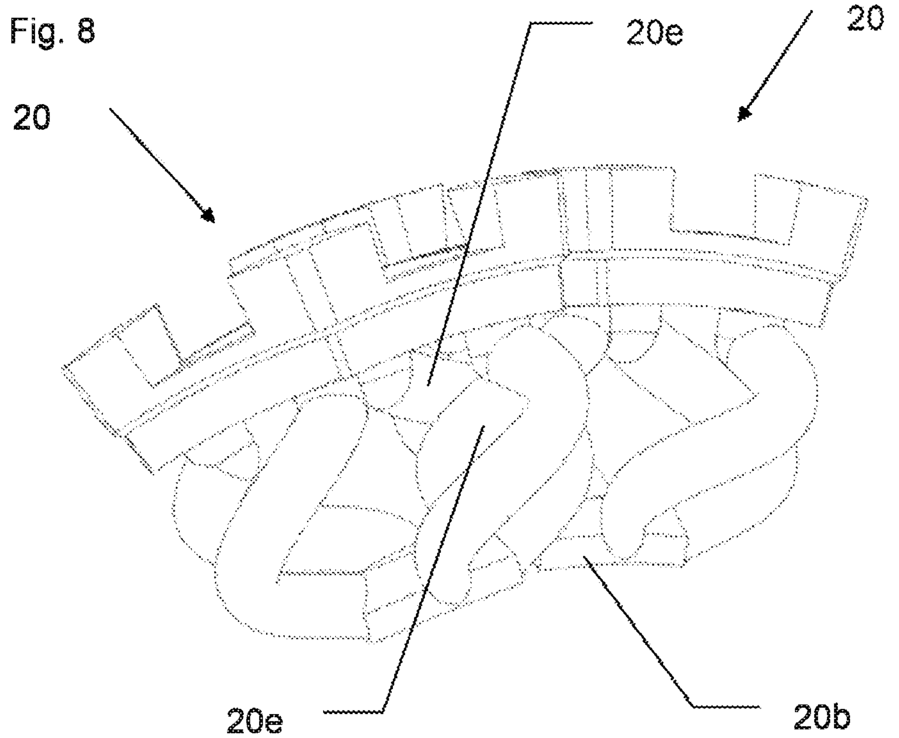
Figure 9:
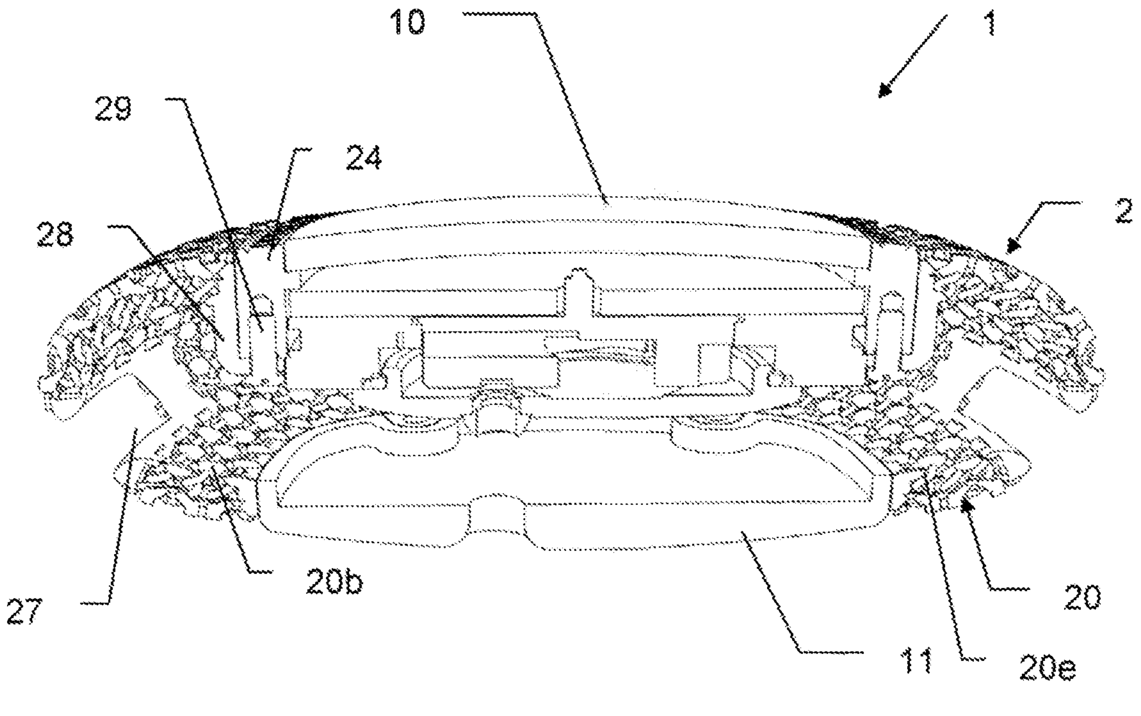

Other characteristics and advantages of the present invention will appear more clearly on reading the following detailed description of embodiments of the invention given by way of non-limiting example and illustrated by the appended drawings, in which:

FIG. 1 shows a first embodiment of a watch case according to the invention, having a deformable outer wall with a network of articulated elements, FIG. 2 shows a second embodiment of the watch case according to the invention, with an underlying elastic mesh, FIG. 3 shows a sectional and elevational view of a third embodiment, FIG. 4 shows a sectional and elevational view of a fourth embodiment with a domed bottom, to which bracelet strands are attached, FIG. 5 shows a fifth embodiment, in which the elastic mesh is formed in two parts, FIG. 6 shows a detail view of an articulated element from above, FIG. 7 shows a detail view of two articulated elements from below in perspective, FIG. 8 shows a perspective detail view of two articulated elements, FIG. 9 shows a sectional view in elevation of a mounting variant of a bezel.

FIG. 1 shows a first embodiment of a watch case 1, having a deformable outer wall.

The watch case 1 is shown in perspective with a cutaway so as to show the inside of the watch case 1. The watch case 1, also called case 1, comprises a middle part 2, closed by a crystal 10 and a bottom 11, so as to generally define a volume inside which a movement is intended in particular to take place. The glass 10 and the bottom 11 are conventionally installed on opposite faces of the box 1, the glass 10 being mounted on an upper face of the box 1 and the bottom being mounted on a lower face of the box 1.

Typically, the box 1 contains a dial 14 and hands 12*h*, 12*m*, a hand to indicate the hour 12*h* and a hand to indicate the minutes 12*m*.

The box 1 further comprises a structure 15 arranged to support a watch movement. This can be housed in a container 30, forming a sealed container. The watch movement allows the training of the 12*h*, 12*m* hands. The caseband 2 further comprises a caseband portion 25 integral with the structure 15 and visible from the upper face of the case 1.

The middle part 2 forms a side portion of the box 1, and a gap 15*b* is formed between the middle part 2 and the container 30, or between the middle part 2 and the structure 15 in a median plane of the middle part 2. The structure 15 and the container are arranged in a volume essentially defined by the middle part, the crystal and the back. The structure 15 can be in one piece or in several parts.

The middle part 2 comprises an outer casing comprising a network of articulated elements 20 which form an outer wall of the outer casing, the outer wall being deformable.

The network of articulated elements 20 is composed of an adequate number of articulated elements 20 interconnected and movable relative to each other, ensuring the flexibility of the box 1. In the example illustrated in FIG. 1, the network of articulated elements 20 comprises approximately five hundred articulated elements 20. It should be noted that the number of articulated elements 20 can be adapted to the size of the box 1, both in terms of diameter and thickness (for example, box diameter of 40 mm, 36 mm, thickness of 8 mm to 12 mm), but also in order to vary the flexibility of the box 1 by adjusting the dimensions of the articulated elements themselves. For example, the number of articulated elements can vary from two hundred to one thousand, depending on the size of the box 1, without being limited to these examples.

Each of the articulated elements 20 comprises an outer panel 20*p*, visible from outside the box 1, an articulated element base 20*b* and interlacing 20*e*. These are the panels that define the outer wall, being located, one another, substantially in the continuity of the adjacent panels. The articulated elements 20 can be made of any suitable material, such as gold, white gold, pink gold, platinum, or a suitable metal.

The 20th interlacings are arranged to make it possible to connect the articulated elements 20 between them. In other words, the articulated elements 20 are interlaced with each other, via their interlaces 20*e*. Thus, the articulated elements 20 are meshed with each other. The links 20*e* are preferably helical, with a link wire diameter of approximately 0.2 to 0.3 mm preferably.

Thus, the term "network of articulated elements 20" means a set of meshes whose more or less dense interlacing forms a mesh, a lattice, or a reticle. In other words, it is a fabric with preferably metallic meshes, that is to say a flexible and thin assembly obtained by the regular assembly of threads, preferably metallic, or interwoven fibers, either by stitches with a single thread, or by weaving with several threads, or formed by a single continuous piece, made by three-dimensional printing (also called 3D printing). In this case, the interlacings and the panels are advantageously formed in one continuous piece. The articulated elements 20 are shown and described in more detail with reference to FIGS. 6 to 8.

The 20*p* panels can be crimped in order to support and maintain 20*d* decorative elements. These decorative elements can be, for example, precious stones, fine stones or organic stones. The mobility of the 20*p* panels makes it possible to create reflections and light effects in the set stones.

It is also possible to provide, in addition to or instead of the crimping, a smoothing of the panels 20*p* or to produce textures on the panels 20*p*, or a surface heat treatment to give for example a satin or colored appearance.

As explained above, the box 1 is deformable, that is to say that the middle part 2 can deform and part of the middle part 2 is mobile with reference to the structure and/or to the container 30 and to the watch movement in the container 30. The middle part 2 allows relative movement between the crystal 10 and the back 11, along a vertical axis Z passing through the crystal 10 and the back 11 and/or along a horizontal plane XY passing through the horizontal axes X and Y, with reference to a watch case 1 placed on its bottom 11. The horizontal plane XY is preferably a main plane of the container 30 or a main plane of the dial 14.

A new kind of watch case is thus obtained, offering an original aesthetic and allowing the user to interact tactilely with his watch, to deform it or create light effects on the 20*p* panels or set stones.

Although it is possible to have a winding stem accessible at the middle, such an arrangement can be complex and can affect the deformability of the middle. It is preferable to provide access to the movement through the bottom, for example by providing an opening in the bottom of the box, allowing access to the bottom of the container. The latter can then have time-setting and/or winding means, operable for example by a key.

FIG. 2 shows a second embodiment of the watch case 1, with an underlying elastic mesh.

In the different embodiments, the reference numbers of the drawings are repeated as much as possible, for the elements common with the other embodiments.

The second embodiment differs from the first embodiment, illustrated in particular in FIG. 1, by the presence of an elastic member 22 supporting the articulated elements 20, preferably at the base of the articulated element 20*b*. The elastic member 22 is preferably underlying, that is to say it is located under the network of articulated elements 20 and is at least partially masked by the latter. In other words, the elastic member is arranged between the articulated elements 20 and the container 30. The elastic member 22 can be made of elastomer or silicone.

The elastic member 22 may be an elastic mesh 22, also called "bumper" in English (i.e. bumper). The elastic mesh 22 forms a frame that supports and supports the network of articulated elements 20. The elastic mesh 22 can be made by 3D printing.

Preferably, the elastic mesh 22 comprises a network of elastic elements, with solid portions 22*b* separated by perforated portions 22*t*. The solid portions 22*b* are preferably arranged opposite the bases of the articulated elements 20*b* so as to support them elastically.

Thus, when the user presses on the middle part 2, at the level of one or more panels 20*p*, the articulated elements 20 are elastically supported, that is to say they return to position initial after user tap is finished.

This also provides resistance to the support of the user, which is pleasant to the touch and allows to play with the wall of the box.

The perforated portions 22*t* of the elastic mesh 22 also contribute to the good mechanical strength of the mesh, in particular by limiting blistering, plastic depression or deterioration of the elastic mesh 22.

Preferably, the stitches, which are the repeating pattern of the elastic mesh 22, are diamond-shaped in top view.

Preferably, the elastic mesh 22 consists of meshes of similar or proportional (or corresponding) size to the meshes of the network of articulated elements 20. In practice, the meshes of the network of articulated elements and the meshes of the elastic mesh are not identical.

As a variant, the elastic mesh can be wider or looser, that is to say that the dimension of the meshes is larger, and that the elastic support is only ensured, for example, for half of the bases of the articulated elements 20*b*.

In the first and second embodiments, the middle portion 25 may be a first row of fixed articulated elements, in comparison with the movable articulated elements 20. Thus, each articulated element is movable vis-à-vis the neighboring or adjacent articulated element, except for the first row which is fixed.

Those skilled in the art can consider other solutions for making the elastic member 22, such as a filling of gel at the level of each articulated element.

FIG. 3 shows a sectional view and elevation of a third embodiment.

The structure 15 has a flat face on the side of the bottom 11. The bottom 11 has a partially flat face on the side of the container 30. In other words, the faces of the structure 15 and of the bottom 11 facing each other are flat or form a plane.

The container 30 can thus move along the vertical axis Z and/or along the horizontal plane XY. It also has a degree of freedom in rotation along the X axis, along the Y axis and/or along the Z axis.

The box 1 further comprises connecting members such as cables 52, 53 interconnecting attachment portions such as lugs 54 of the box 1. The structure 15 has a domed face (or domed surface crown) opposite the cables 52, 53, so as to improve the guiding of the container 30 in the event of the user pressing on the middle part 2 or on the crystal 10. This type of mounting of the bracelet with reference to the box is particularly adapted to a deformable box according to the present invention. As an alternative to this type of mounting of the bracelet, it is possible to provide a bracelet mounted through the case 1 and which is passed through the case 1 via slots made in the caseband. The bracelet can thus comprise a single main portion arranged to go around the wrist and provided or not with an attachment portion in the caseband. Alternatively, the wristband may not include attachment portions and/or connecting portion. The bracelet can be arranged in the interior volume of the box 1 between the structure 15 and the bottom 11. These types of bracelet assembly are described in detail in a patent application filed by the applicant on the same day as the present application, having for the title "Watch comprising a mobile bracelet" and the content of which is incorporated by reference into the present application.

FIG. 4 shows a sectional view and elevation of a watch case according to a fourth embodiment, with a domed bottom, to which bracelet strands are attached.

The watch case 1 is associated with a bracelet with two strands 50, 51 connected to the case 1 via the horns 54. The two strands 50, 51 can be made of leather or any other suitable material, and linked together by a pin buckle or a folding clasp.

In one embodiment, the bracelet can be made at least in part with a network of articulated elements similar to that of the box 1. Advantageously, the articulated elements of the box and of the bracelet are printed during in the same operation and are formed in one piece. The articulated elements forming the bracelet can be connected to a bracelet portion formed in a conventional manner by links or a flexible strand, or to a clasp. The portion in articulated elements or, where appropriate, the portion formed in a conventional manner, can be dimensioned according to the size of the wrist of the wearer, in order to adjust the total length of the bracelet.

It should be noted that the bracelet can be adapted to all the embodiments of the box 1 described in this description.

The cables 52, 53 are made of any suitable material, such as for example titanium, in particular grade 5 titanium, which makes it possible to limit the elongation of the assembly when a tensile force is applied at the level of the watch strap, so as not to damage the network of articulated elements 20.

In the fourth embodiment of the box 1, the bottom 1 further comprises a domed portion 11*b*, the domed part of which is oriented towards the inside of the box 1. In other words, the domed bottom 11*b* protrudes towards the inside of the box 1.

This makes it possible to guide the structure 15 and the container 30 on the curved portion 11*b* when the support of the structure 15 on the curved portion 11*b*.

In addition, it is possible to provide a curved (or spherical) lower portion for the structure 15, the curved being oriented towards the bottom 11. The curved lower portion of the structure 15 can thus cooperate and be guided by the curved portion 11*b* of the bottom 11 or by the bottom 11 itself in the absence of the curved portion 11*b*.

In addition, the cooperation of the curved lower portion of the structure 15 and the curved portion 11*b* of the bottom 11 allows a point contact between the two portions, thus creating an unstable movement of the container 30, ultimately improving the aesthetics of box 1.

In the embodiment illustrated in FIG. 4, the curved portion 11*b* of the bottom 11 is centered. It is possible to provide a lateral offset in the XY plane of the crown, that is to say for example that the crown is moved towards one of the lugs, or is moved towards "6 o'clock", or towards "3 o'clock" or around "9 am" for example.

In the third and fourth embodiments, the caseband portion 25 integral with the structure 15 is attached to the bezel 24 and the bezel 24 is screwed by screws 26 to the structure 15.

The caseband 2 may further comprise slots 27 arranged to allow the passage of the bracelet strands.

FIG. 5 shows a fifth embodiment, in which the elastic member 22 is formed in two parts. A first elastic mesh part 23*a* enveloping one of the horns 54 and a second elastic mesh part 23*b* enveloping the other of the horns 54 on the other strand of the bracelet. Horns 54 are connected by cables 52, 53.

Note that it is possible to provide one or two horns 54 on the side of the first strand 50 of the bracelet, and one or two horns 54 on the side of the other strand 51 of the bracelet.

The elastic mesh in two parts 23*a*, 23*b* makes it possible to improve the flexibility of the middle part, not shown in FIG. 5, for reasons of clarity. The deformability of middle part 2 is thus greater, or freer, in the central zone, between the two parts of elastic member 22.

The elastic member can be divided into a plurality of sub-assemblies, distributed under the outer casing, on the periphery of the structure 15 or on only a middle part underlying the middle part 2.

It is possible to have an elastic member 22 in the form of elastic strips, arranged between the middle part 2 and the container 30 or the structure 15. The elastic member 22 can also comprise a gel, such as for example a torus composed of gel, or a filling of case middle 2 with a gel.

More generally, it is also possible to provide a support arranged between the structure and the casing. This support can be elastic as mentioned above with the elastic member, but also rigid, to form a stop against the deformations of the outer casing. The support can also be a combination of elastic portions and rigid portions.

FIG. 6 shows a detail view of an articulated element 20 from above.

Here, top view means the view from outside the case 1 when the articulated element 20 is assembled in a network of articulated elements 20 to form the outer envelope of the middle part 2, perpendicular to the envelope surface.

Each articulated element 20 comprises, as described above, an outer panel 20*p*. In the example represented in FIG. 6, each articulated element 20 comprises four links 20*e*, preferably helical.

The articulated element 20 is shown with a diamond 20*d* set on the outer panel 20*p*. By way of example, the dimension of the panel 20*p* is approximately 1.60 mm per side.

FIG. 7 shows a detail view of two articulated elements 20 from below in perspective.

The bottom view here means the view from inside the case 1 when the articulated element 20 is assembled into a network of articulated elements 20 to form the outer envelope of the middle part 2.

As described above, the articulated elements 20 each comprise an articulated element base 20*b*.

The articulated elements 20 are interlaced: a 20th interlacing of an articulated element 20 is interlaced with a 20th interlacing of another neighboring articulated element 20. Thus, the interlacings 20*e* are in a position of engagement with each other, that is to say are held to each other, with a clearance. This makes it possible to mesh the articulated elements 20 together, so as to connect them.

It is possible to provide a clearance between the panels 20*p* of the articulated elements 20. The clearance between two articulated elements 20 is typically 0.1 to 0.2 mm at the level of the panels 20*p*. This game is not contradictory with the fact that the surfaces of the panels are substantially continuous with each other to form the outer wall.

FIG. 8 shows a perspective detail view of two articulated elements 20.

The articulated elements 20 are interlaced with each other, by means of the interlacings 20*e*. The articulated elements 20 are typically 1.6 mm high.

FIG. 9 shows a sectional and elevational view of an alternative fixing of the bezel 24.

The caseband 2 comprises fixing lugs 28 which can be made by printing and integral with the first row of articulated elements, which is rigid. The bezel 24 is fixed to the fixing lugs by screws 29.

It will be understood that various modifications and/or improvements obvious to those skilled in the art can be made to the various embodiments of the invention described in the present description.

In particular, reference is made to the possibility of having a different number of 20*e* links, for example two or three per articulated element 20, of having a different shape of 20*e* links, of not providing a engagement of all the articulated elements between them but only part of them (for example half).

Those skilled in the art may consider different variants of the embodiments described above. It is thus possible to provide an engagement of the interlacings 20*e* with an intermediate piece of the box 1 rather than with the interlacings 20*e* of the neighboring articulated element 20. This intermediate part can be the elastic member 22 or another underlying part of the box 1.

It is possible to have another general shape of the box 1, represented in the shape of a deformed torus or paved with rounded corners, but which could also be triangular, oval or conical.

It is possible to have the structure 15 arranged to support the container 30, made in the form of claws, attached to an upper portion of the middle part 2. In this case, the domed portion of the structure 15 would be replaced by a equivalent convexity on the container 30.

A person skilled in the art can also imagine a variant in which the back is also made with articulated elements which extend the middle part. Their dimensions are then adapted in order to be able to produce the entire surface. Access to the movement will be provided for adjustment/winding operations, through an orifice or a removable panel. This variant makes it possible to have a very great flexibility of the box. Provision may be made for a bumper interposed between the structure and the bottom, to prevent the structure or the container from coming into direct contact with the bottom.

According to an additional embodiment, the construction principle described above can be used to make a piece of jewelry, such as a ring, an earring, a pendant, etc. Such a piece of jewelry comprises a attachment, for example a clasp, or connection, such as a buckle, and a body. The body comprises an outer envelope comprising a network of articulated elements which form an outer wall of the outer envelope, the articulated elements are movable relative to each other so as to make said outer wall deformable. The outer wall can also be elastically movable, in particular by the addition of an underlying elastic member. The whole of the description and the variants relating to the production of the articulated elements and of the support, elastic or not,

The invention claimed is:

1. A watch case comprising:

a structure arranged to support a watch movement, and a caseband comprising an outer envelope connected to said structure and arranged to house said structure, said envelope comprising a network of articulated elements which together form an outer wall of the outer envelope, the elements hinged are movable relative to each other and hinged to each other so as to make said outer wall deformable, and said articulated elements being interconnected to each other throughout the network via interlacings to form a continuous deformable mesh structure.

2. The watch case according to claim 1, characterized in that the articulated elements are formed in one piece.

3. The watch case according to claim 1, characterized in that the outer wall is elastically deformable.

4. The watch case according to claim 1, wherein each articulated element comprises an outer panel.

5. The watch case according to claim 1, wherein the interlacings comprise a helical structure, meshing the articulated elements to each other.

6. The watch case according to claim 1, wherein at least one articulated element is supported by an elastic mesh.

7. The watch case according to claim 6, further comprising lugs, and wherein the elastic mesh comprises elastic mesh parts, each elastic mesh part being arranged around or on at least one of the horns.

8. The watch case according to claim 1, comprising a bottom, in which the structure has a portion projecting towards the bottom of the watch case and capable of cooperating with the bottom to guide movements of the structure during deformation of the outer envelope, and/or in which the bottom has a portion projecting towards the inside of the watch case and capable of cooperating with the structure to guide the movements of the structure during the deformation of the outer envelope.

9. The watch case according to claim 8, wherein the bottom has a curvature whose center of curvature is on the side of the bottom.

10. The watch case according to claim 1, wherein the caseband comprises horns, and wherein a center of curvature is also on a side of one of the horns.

11. The watch case according to claim 1, in which a gap is formed between a container and the outer envelope.

12. The watch case according to claim 1, wherein at least one articulated element is decorated by crimping with a decorative element, wherein the decorative element is a stone.

13. The watch case according to claim 1, wherein the outer envelope comprises a removable element arranged to allow access to a movement adjustment means housed in a container.

14. A watch case comprising a bottom, a structure intended to support a watch movement, a crystal closing, and a middle part comprising a deformable outer envelope housing the structure, so as to allow relative movement between the bottom and the crystal closing, and said outer envelope comprising a network of articulated elements that are interconnected to each other throughout the network via interlacings to form a continuous deformable mesh structure.

15. A watch comprising the watch case according to claim 14.

16. The watch according to claim 15, comprising a bracelet connected to the watch case, characterized in that the bracelet is made at least in part with articulated elements, formed in one piece with the articulated elements of said case.

17. A jewel comprising a fastening or connecting member and a body comprising an outer casing comprising a network of articulated elements which together form an outer wall of the outer casing, the articulated elements being movable relative to each other so as to make said outer wall deformable, and said articulated elements being interconnected to each other throughout the network via interlacings to form a continuous deformable mesh structure.

18. The jewel according to claim 17, characterized in that the outer wall is elastically deformable.

* * * * *